(12) United States Patent
Perlatti

(10) Patent No.: US 8,075,765 B2
(45) Date of Patent: *Dec. 13, 2011

(54) RAIN WATER COLLECTION SYSTEM COMPONENTS AND METHOD OF FABRICATION

(75) Inventor: Deano Perlatti, Bainbridge Island, WA (US)

(73) Assignee: Seattle Tarp Company, Tukwila, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/322,881

(22) Filed: Feb. 9, 2009

(65) Prior Publication Data

US 2010/0200482 A1    Aug. 12, 2010

(51) Int. Cl.
*E04D 13/04* (2006.01)

(52) U.S. Cl. ............ 210/162; 210/170.03; 210/449; 210/460; 52/12; 52/16

(58) Field of Classification Search .......... 210/162, 210/170.03, 446, 449, 459, 460; 52/11, 12, 52/16; 220/666

See application file for complete search history.

(56) References Cited

U.S. PATENT DOCUMENTS

| | | | |
|---|---|---|---|
| 1,289,410 A * | 12/1918 | Day | 220/904 |
| 3,904,121 A * | 9/1975 | Geagan | 239/208 |
| 3,966,121 A * | 6/1976 | Littman | 239/197 |
| 4,245,499 A | 1/1981 | Nguyen et al. | |
| 4,383,564 A * | 5/1983 | Hoie | 220/666 |
| 4,504,823 A | 3/1985 | Berthel | |
| 4,665,744 A | 5/1987 | Smith | |
| 4,801,377 A * | 1/1989 | Bolt | 210/162 |
| 4,813,190 A | 3/1989 | Wittig | |
| 4,837,987 A * | 6/1989 | Fender | 52/11 |
| 4,899,400 A | 2/1990 | Torres et al. | |
| 4,919,165 A | 4/1990 | Lloyd | |
| 5,114,594 A * | 5/1992 | Rosebrock et al. | 210/446 |
| 5,220,755 A * | 6/1993 | Roles | 52/16 |
| 5,355,122 A | 10/1994 | Erickson | |
| 5,407,091 A | 4/1995 | Wallis et al. | |
| 5,421,198 A | 6/1995 | More, III et al. | |
| 5,709,051 A * | 1/1998 | Mazziotti | 52/12 |
| 5,730,179 A * | 3/1998 | Taylor | 52/16 |
| 6,358,405 B1 * | 3/2002 | Leahy | 210/162 |
| 6,363,781 B1 | 4/2002 | Moore | |
| 6,397,526 B1 | 6/2002 | Saul et al. | |
| 6,453,622 B1 | 9/2002 | Walters | |
| 6,470,628 B1 | 10/2002 | Walters | |
| 6,568,132 B1 | 5/2003 | Walters | |
| 6,818,127 B1 | 11/2004 | Ketrow | |
| 6,880,294 B2 | 4/2005 | Walters | |
| 6,941,702 B1 * | 9/2005 | Abrams et al. | 52/16 |
| 7,010,887 B2 | 3/2006 | Walters | |
| 7,152,468 B1 | 12/2006 | Peterson | |
| 7,156,987 B1 * | 1/2007 | Sanguinetti | 210/164 |
| 7,159,455 B1 | 1/2007 | Leonard | |
| 7,257,933 B2 | 8/2007 | Walters | |
| 2004/0200781 A1 * | 10/2004 | Shaw et al. | 210/162 |
| 2010/0199574 A1 * | 8/2010 | Perlatti | 52/12 |

* cited by examiner

Primary Examiner — Christopher Upton

(57) ABSTRACT

Non-limiting embodiments disclosed herein include components of a rain water collection system and methods of fabricating the components. The disclosed components include a down spout interface bladder and a rain water holding device. Also disclosed are a method of fabricating a down spout interface bladder and a method of fabricating a rain water holding device.

15 Claims, 20 Drawing Sheets

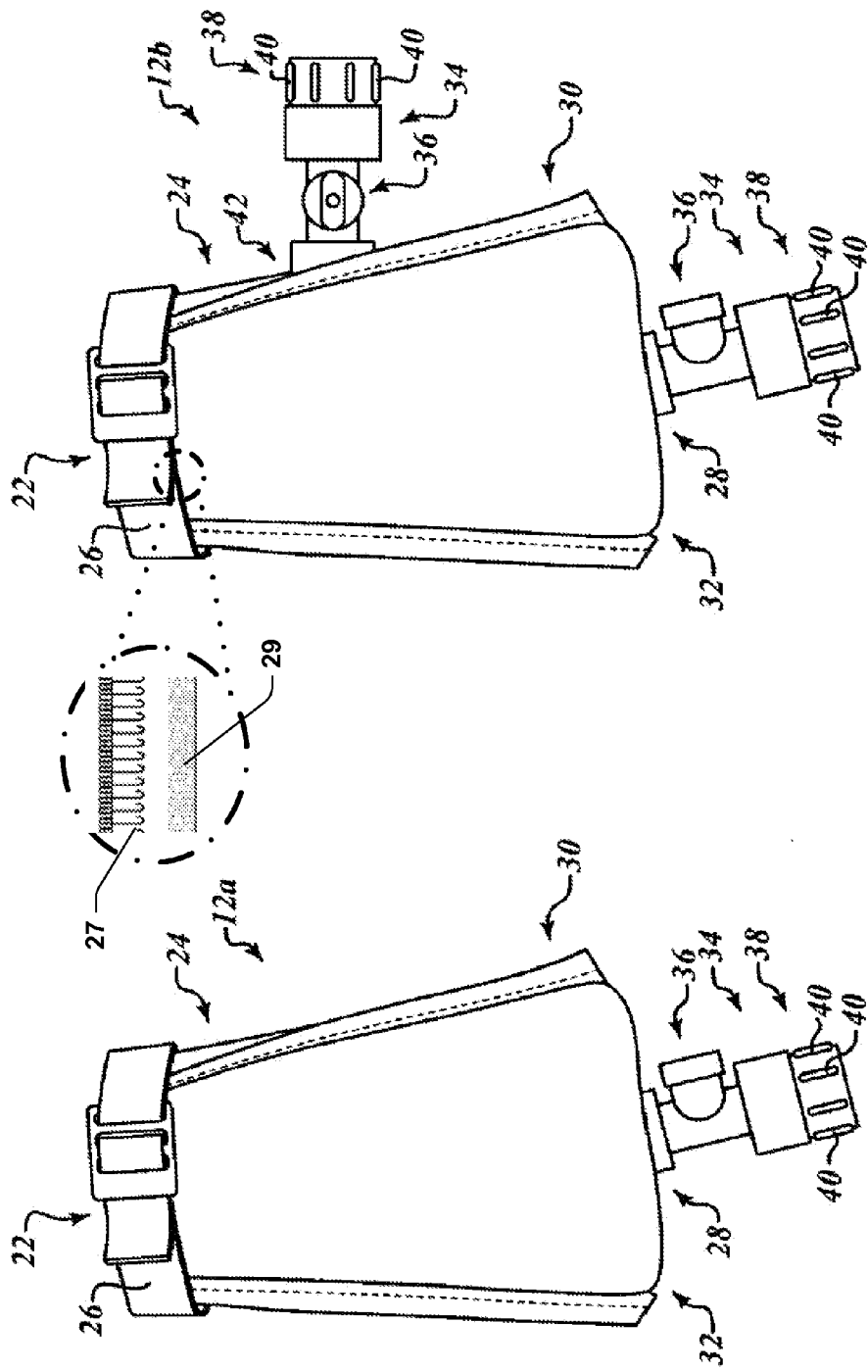

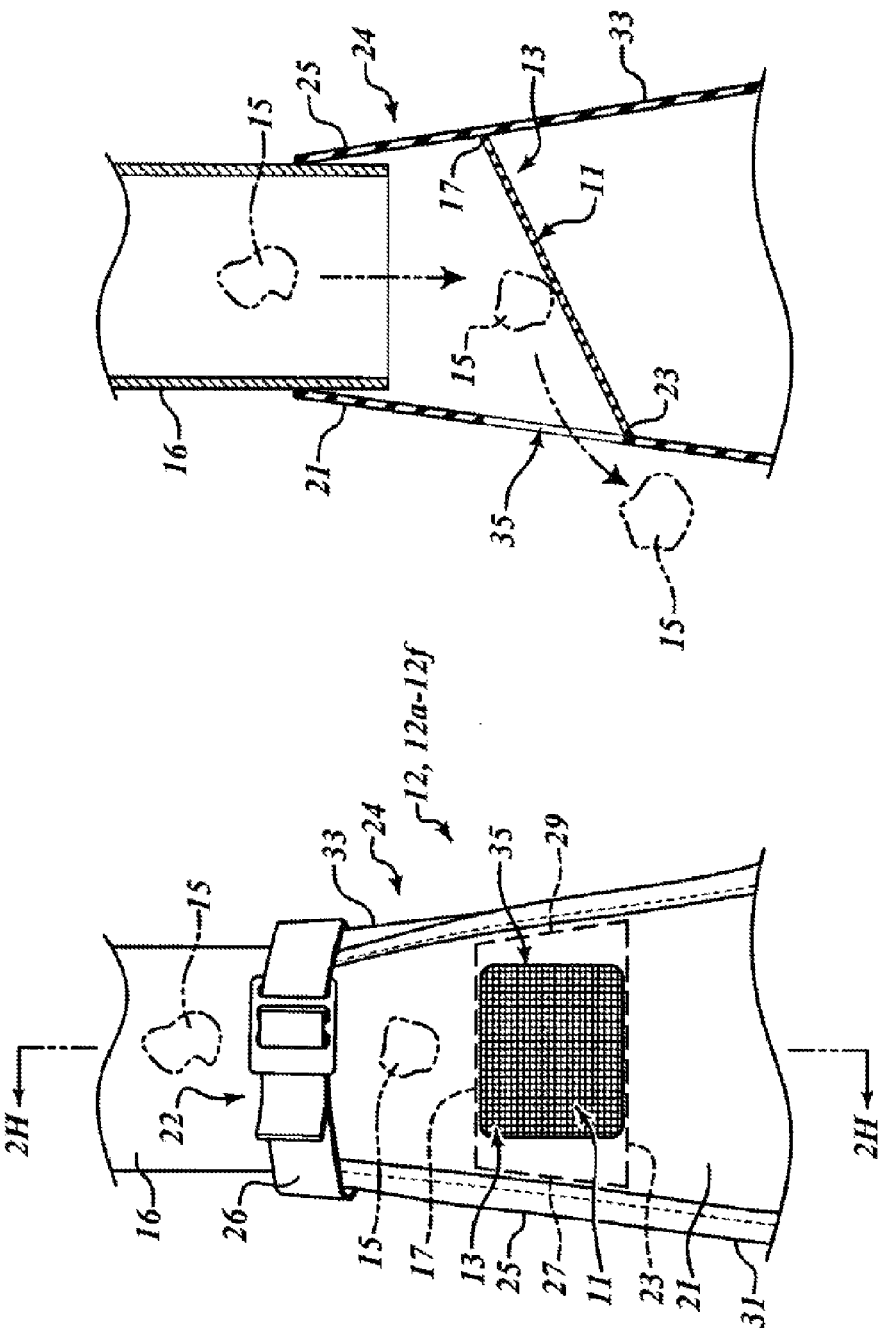

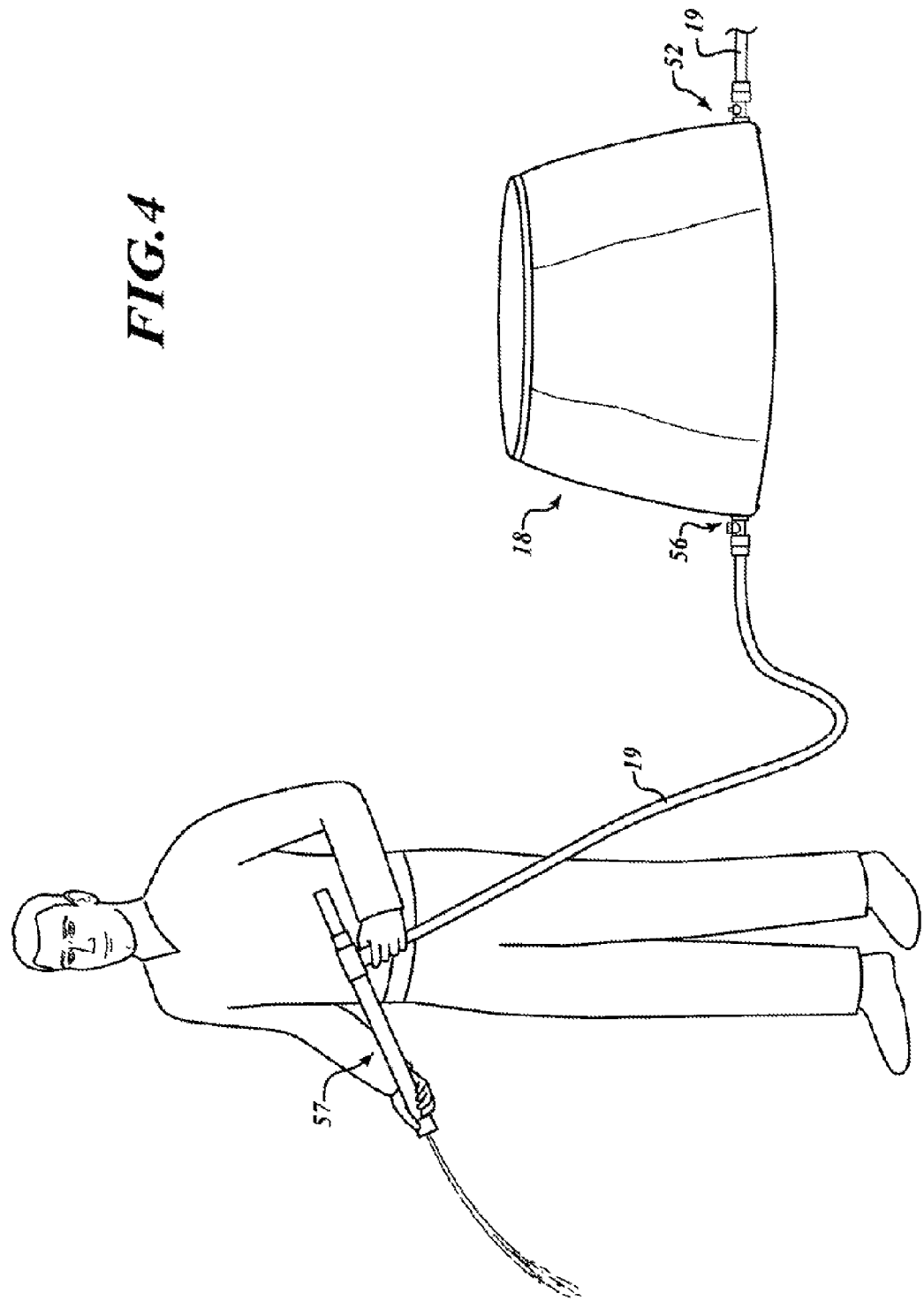

RAIN WATER COLLECTION SYSTEM COMPONENTS AND METHOD OF FABRICATION

BACKGROUND

Rain water has been collected for various purposes, such as drinking water, irrigation, cleaning, washing, household use, industrial use, agricultural use, and the like. Systems for collecting rain water can range from simple rain barrels to complex systems including filtration systems, pumps, cisterns, tanks, and the like.

It would be desirable to provide a system and method for collecting rain water that provides for ease of manufacture and use.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be illustrative, not limiting in scope. In various embodiments, one or more of the problems described above in the Background have been reduced or eliminated, while other embodiments are directed to other improvements.

In a non-limiting, illustrative embodiment, a down spout interface bladder includes a bladder body defining an inlet port configured to receive therein an end section of a down spout and an outlet port. A closure device is arranged to tighten the inlet port around an end section of a down spout.

In another non-limiting, illustrative embodiment, a rain water holding device includes a bottom member and a self-supporting side member attached to the bottom member. The side member defines an inlet port and an outlet port. The rain water holding device also includes a domed top member.

In another non-limiting, illustrative embodiment, a method of fabricating a down spout interface bladder includes providing fabric material, defining an inlet port in the fabric material, and defining an outlet port in the fabric material. The fabric material is formed into a bladder such that an end section of a down spout is receivable in the inlet port. A closure device is disposed about the inlet port such that the inlet port is tightenable around an end section of a down spout.

In another non-limiting, illustrative embodiment, a method of fabricating a rain water holding device includes providing fabric material, defining an inlet port in the fabric material, and defining an outlet port in the fabric material. The fabric material is formed into a container such that the inlet port and the outlet port are disposed in a side of the container and toward a bottom of the container. A domed top member is hingedly disposed to the side of the container toward a top of the container. A closure device is disposed about at least a portion of the domed top member and at least a portion of the side of the container toward the top of the container such that the domed top member is releasably closable with the side of the container toward the top of the container.

In addition to the illustrative embodiments and aspects described above, further embodiments and aspects will become apparent by reference to the drawings and by study of the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

FIGS. 2A-2H are perspective views of illustrative embodiments of down spout interface bladders;

FIG. 4 is a perspective view of an illustrative application of a rain water holding device;

DETAILED DESCRIPTION

Figure 1:
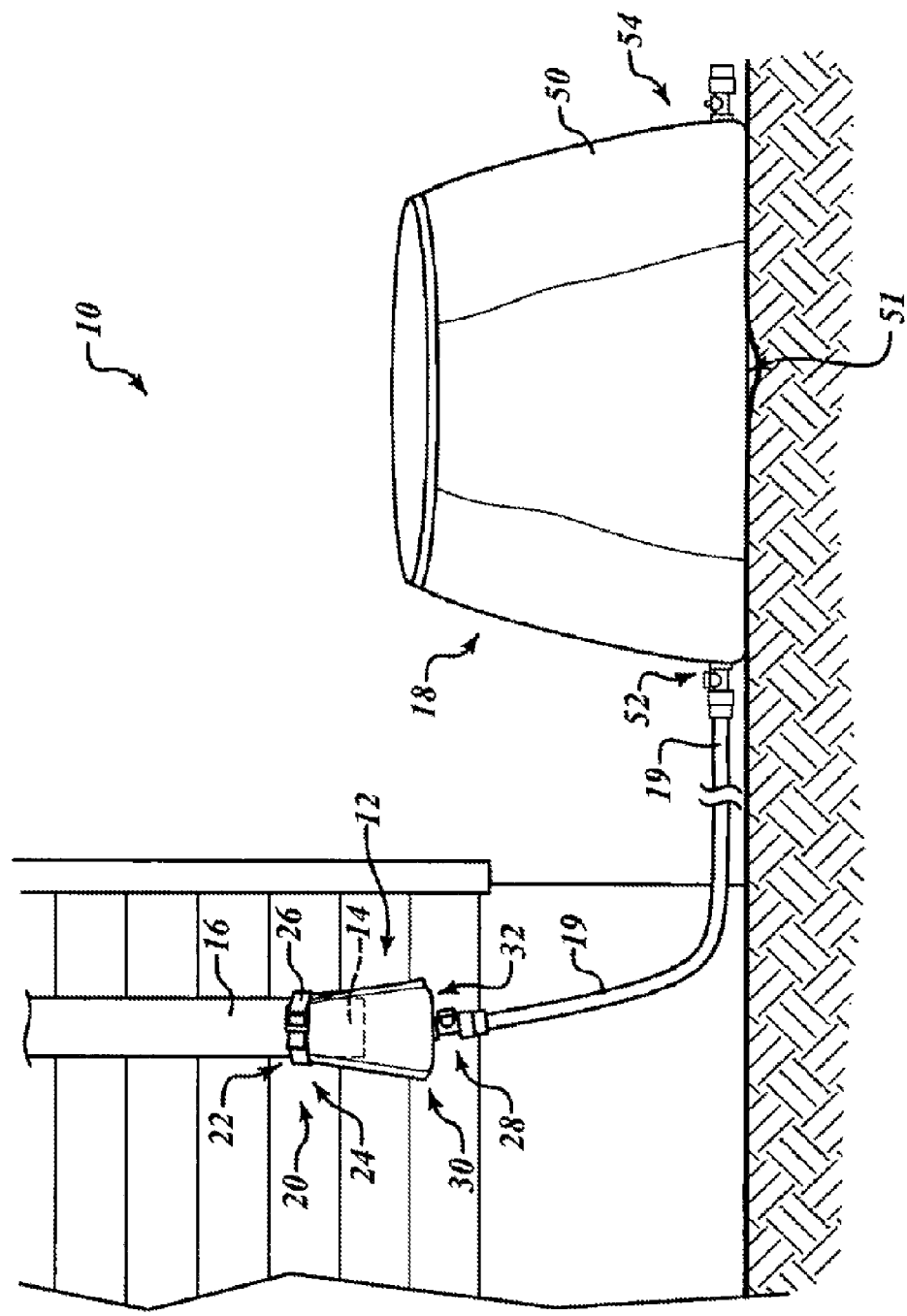
FIG. 1 illustrates a non-limiting example of a rain water collection system.

By way of overview and referring to FIG. 1, in a non-limiting, illustrative system 10 for collecting rain water, a down spout interface bladder 12 is removably attachable to an end section 14 of a down spout 16. A rain water holding device 18 is hydraulically couplable to the down spout interface bladder 12. In some embodiments the rain water holding device 18 may be hydraulically coupled to the down spout interface bladder 12 with a tube member 19, such as without limitation a hose such as garden hose or any other kind of hose as desired. Rain water that is gravitationally urged down the down spout 16 can be sent to and collected in the rainwater holding device 18 for storage until it is desired to use the stored rain water. Details of illustrative embodiments will now be set forth below.

The down spout 16 extends downwardly from a gutter (not shown) that is associated with a building (a portion 20 of which is shown in FIG. 1), such as without limitation: a residential building such as a house or an apartment building; a commercial or industrial building such as an office building, a store, or a factory; a government or military facility; an educational facility; a healthcare facility; or the like. It will be appreciated that the building from which the system 10 can collect rain water can be any type of building. To that end, no limitation is intended and is not to be inferred regarding the type of building from which the system 10 can collect rain water.

The down spout interface bladder 12 suitably is any type of bladder that is configured to receive rain water that is gravitationally urged down from the down spout 16. The down spout interface bladder 12 may be made from any material as desired for a particular application. For example and without limitation, the down spout interface bladder 12 may be made from fabric such as vinyl-coated polyester, or vinyl-coated co-polymer, or urethane-coated polyester, or urethane-coated co-polymer, or the like. In some embodiments, the fabric from which the down-spout interface bladder 12 is made may be potable water grade fabric, if desired.

Generally, the down spout interface bladder 12 includes an inlet port 22 that is configured to receive therein the end section 14 of the down spout 16. The inlet port 22 suitably may be an opening, defined in the fabric of the down spout interface bladder 12, that is located toward an upper portion 24 of the down spout interface bladder 12.

A closure device 26 suitably is arranged to tighten the inlet port 22 around the end section 14 of the down spout 16. With sufficient tightening of the inlet port 22 around the end section 14 of the down spout 16, the closure device 26 can cause the fabric of the down spout interface bladder 12 (in the vicinity of the inlet port 22) to frictionally engage an exterior surface of the downspout 16 (in the vicinity of the end section 14 of the down spout 16). As a result of such frictional engagement, the down spout inlet bladder 12 can be releasably attached to the down spout 16. The closure device 26 can include any type of closure device as desired for a particular application. Given by way of non-limiting examples, the closure device 26 can include without limitation hook and loop fasteners (e.g. hooks 27 and loops 29 shown in an enlarged portion of FIG. 2B), a drawstring, at least one set of male and female members such as snaps and receptacles, or the like.

The down spout interface bladder 12 further includes an outlet port 28. The outlet port 28 suitably is arranged to engage (with a substantially water-tight seal) the tube member 19 to connect the tube member 19 and the down spout interface bladder 12. The tube member may be any type of hose as desired for a particular application. In some embodiments the tube member 19 may be a typical garden hose. In some other embodiments, the tube member 19 may be a hose that is larger than a typical garden hose and in yet other embodiments the tube member 19 may be a hose that is smaller than a typical garden hose. In some embodiments, an exterior surface of the outlet port 28 may define threads such that the tube member 19 may be threadedly received thereon. If desired, other fittings (described below) may be threadedly received on the threads of the outlet port 28, if desired.

The outlet port 28 suitably is located toward a lower portion 30 of the down spout interface bladder 12. In some embodiments (and as shown in FIG. 1), the outlet port 28 may be located in a bottom portion 32 of the down spout interface bladder 12, thereby acting as a low-point drain. In some other embodiments discussed below, the outlet port 28 may be located in other locations on the down spout interface bladder 12. It will be appreciated that the lower in the down spout interface bladder 12 the outlet port 28 is located, the less standing rain water will remain in the down spout interface bladder 12 below the level of the outlet port 28.

The down spout interface bladder 12 may be provided in a variety of embodiments with features as desired for a particular application. For example and referring to FIG. 2A, a down spout interface bladder 12A includes the outlet port 28 located in the bottom portion 32 (as also shown in FIG. 1). The exterior surface of the outlet port 28 is threaded, as described above. In some embodiments, an isolation fitting 34 can be threadedly received on the threads of the outlet port 28. The isolation fitting 34 suitably includes an isolation valve 36 and a threaded adapter 38. The isolation valve 36 can be repositioned between an open position and a shut position to permit flow and stop flow, respectively, of rain water from the down spout interface bladder 12A. The threaded adapter 38 is rotatable and can have a threaded interior surface to permit threadedly engaging the tube member 19 (not shown in FIG. 2A). If desired, an exterior surface of the threaded adapter 38 can include raised features 40, such as knurls, protrusions, or the like, that enable gripping and rotating the threaded adapter 38 about the tube member 19.

Referring to FIG. 2B, a down spout interface bladder 12B is similar to the down spout interface bladder 12A (FIG. 2A), but in addition the down spout interface bladder 12B suitably includes an overflow port 42. During periods of heavy rain, a rate of rain water flowing into the down spout interface bladder 12B may exceed the throughput capacity of the outlet port 28 and the tube member 19 attached thereto. In such a case, water level may rise in the down spout interface bladder 12B. The overflow port 42 can help permit a controlled flow of rain water from the down spout interface bladder 12 if input flow rate exceeds outlet flow rate and water level rises. A controlled flow from the overflow port 42 can help prevent an overflow of water through the inlet port 22. If desired, as illustrated in FIG. 2B, an isolation fitting 34 (as described above) can be threadedly received on the overflow port 42.

Figure 2D:
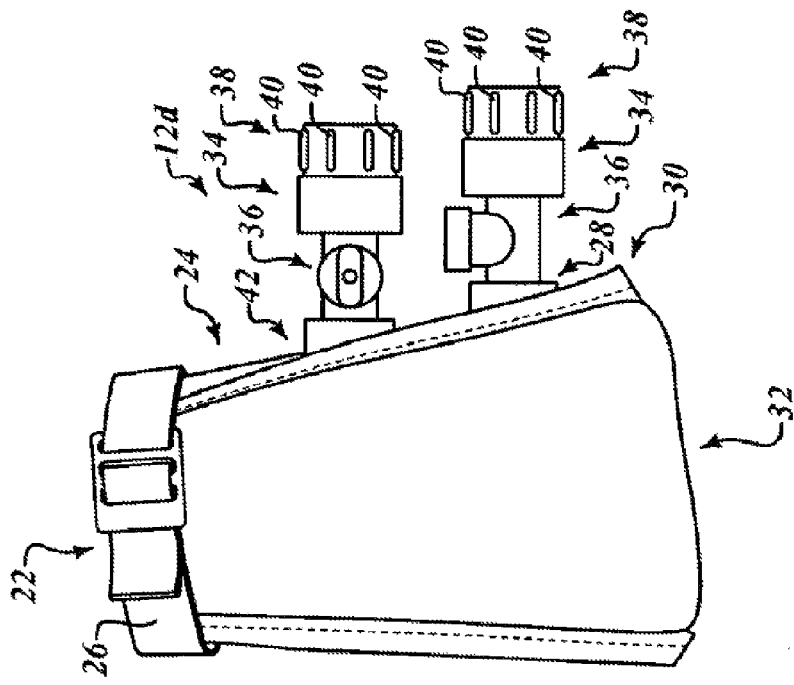
Figure 2C:
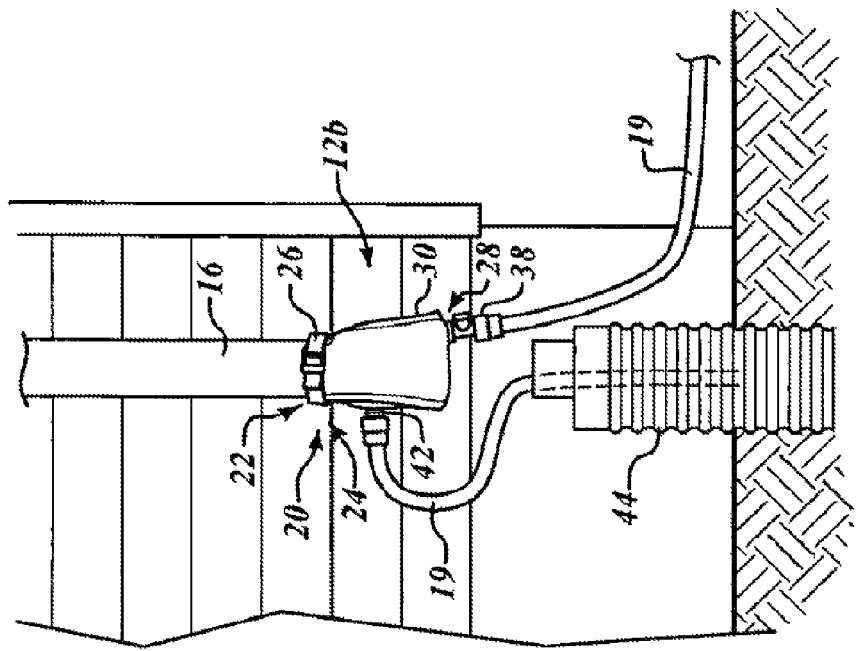

Referring to FIG. 2C, if desired, a tube member 19 can be threadedly received on the overflow port 42. In some arrangements, the tube member 19 can extend from the overflow port to a drain 44, if desired. It will be noted that, as illustrated in the arrangement shown in FIG. 2C, an isolation fitting need not be received on the overflow port 42.

Referring to FIG. 2D, a down spout interface bladder 12D also includes an outlet port 28 and an overflow port 42. The overflow port 42 for the down spout interface bladder 12D suitably is the located similarly to the overflow port 42 for the down spout interface bladder 12B (FIG. 2B). However, instead of being located in the bottom portion 32, the outlet port 28 is located in the lower portion 30. It may be desirable to locate the outlet port 28 as low in the down spout interface bladder 12 as practicable, thereby minimizing any amount of standing rain water that may remain in the down spout interface bladder 12D below the level of the outlet port 28. Other features of the down spout interface bladder 12D are the same as those discussed above and need not be repeated.

Figure 2F:
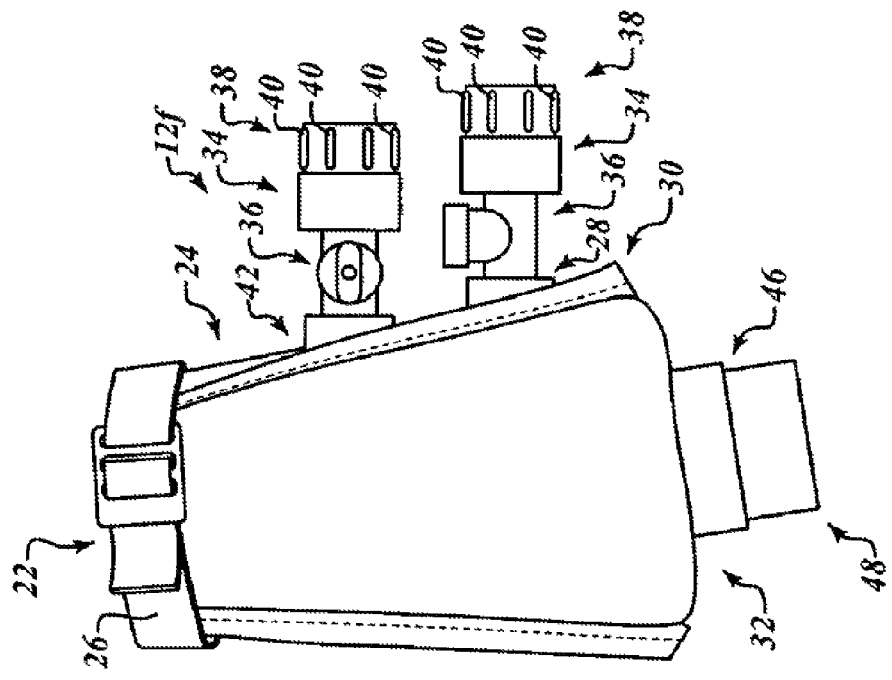
Figure 2E:
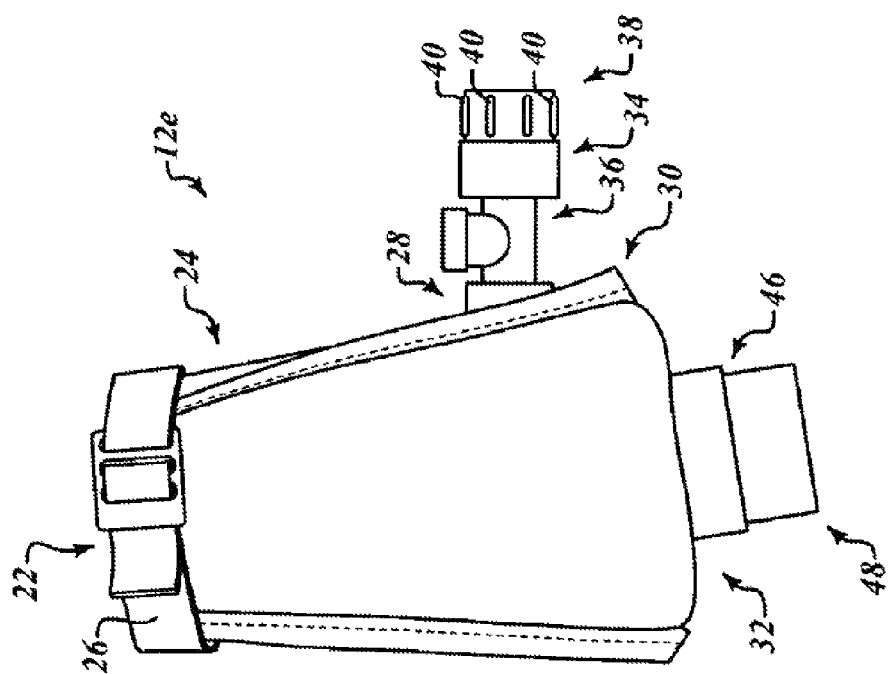

Referring to FIG. 2E, a down spout interface bladder 12E can include a clean-out port 46 that is defined in the bottom portion 32. The clean-out port 46 suitably is closed by a cap 48 or the like. The down spout interface bladder also includes an outlet port 28 disposed toward the lower portion 30, as described above for the down spout interface bladder 12D (FIG. 2D).

It will be appreciated that debris, such as without limitation gravel from roof shingles, leaves, pine needles, twigs, portions of branches, and the like, can be entrained in rain water and can enter the down spout interface bladder 2E. Such debris may settle toward the bottom of the down spout interface bladder 12E below the outlet port 28 (although some of the debris may exit the down spout interface bladder 12E via the outlet port 28). The cap 48 may be removed and any debris that has settled in the bottom of the down spout interface bladder 12E can be removed via the clean-out port 46 while the down spout interface bladder 12E remains in-place. Thus, the clean-out port 46 can help permit removal of debris from the down spout interface bladder 12E without first removing the down spout interface bladder 12E from the down spout 16 (not shown in FIG. 2E).

Referring to FIG. 2F, a down spout interface bladder 12F includes an outlet port 28 in the lower portion 30 and a clean-out port 46 in the bottom portion 32 (similar to the down spout interface bladder 12E (FIG. 2E)). The down spout interface bladder 12F also includes an overflow port 42 (similar to the down spout interface bladder 12D (FIG. 2D)).

Because these features have been described above, for sake of brevity their details need not be repeated for an understanding.

Referring to FIGS. 2G and 2H, a debris filter 11 may be provided, if desired, for any one or more of the down spout interface bladders 12 (FIG. 1), 12A (FIG. 2A), 12B (FIG. 2B), 12D (FIG. 2D), 12E (FIG. 2E), and/or 12F (FIG. 2F). The debris filter 11 spans across an interior opening of the down spout interface bladder. An upper portion 13 of the debris filter 11 suitably is provided toward the upper portion 24. In some embodiments, the debris filter 11 is a screen arranged in a matrix of rows and columns of material that may be made of a mesh, such as without limitation a super mesh vinyl coated polyester or the like. Openings defined in the matrix suitably are sized to be smaller than the size of typical debris 15 desired to be filtered, such as without limitation leaves, evergreen needles, moss, twigs, pine cones, and the like.

The debris filter 11 is attached along an upper edge 17 to a side 21 of the down spout interface bladder. A lower edge 23 of the debris filter 11 is attached to a side 25 of the down spout interface bladder. Side edges 27 and 29 of the debris filter 11 are attached to sides 31 and 33 of the down spout interface bladder. The debris filter 11 suitably is attached to the down spout interface bladder using any desired attachment technique, such as without limitation: sewing; welding, like radio-frequency welding or hot air welding; or adhering, such as by gluing or bonding with an adhesive.

A debris egress opening 35 is defined in the side 25 of the down spout interface bladder. The debris egress opening 35 suitably is sized to permit filtered debris 15 to exit the down spout interface bladder. Thus, the debris egress opening 35 suitably is sized sufficiently large enough to accommodate passage of filtered debris 15 therethrough. In some embodiments, sizing of the debris egress opening 35 to approximate the size of the debris filter 11 minimizes material remaining in the side 25 of the down spout interface bladder in the vicinity of the debris filter 11. This approximate sizing of the debris egress opening 35 therefore can help mitigate possibility of filtered debris 15 from being snagged on material. Mitigating the possibility of snagging filtered debris 15 on material can help increase probability that filtered debris 15 can exit the down spout interface bladder, thereby helping mitigate the possibility of clogging the down spout interface bladder.

The debris filter is arranged such that an angle a is defined between the debris filter 11 and the side 17 of the down spout interface bladder. The angle a suitably is any non-zero angle less than ninety degrees as desired.

The smaller the angle a the more likely that filtered debris 15 will be gravitationally urged downward along an upper surface of the debris filter 11 and will exit the down spout interface bladder via the debris egress opening 35. However, the smaller the angle a the lower the debris filter 11 and the debris egress opening 35 are located in the down spout interface bladder. Such a location can make available less storage capacity in the down spout interface bladder in the event that rain water enters the down spout interface bladder at a rate that is faster than a rate that rain water can exit the down spout interface bladder through the outlet port (not shown in FIGS. 2G and 2H).

Conversely, the larger the angle a (that is, the closer the angle a approaches ninety degrees) the less likely that filtered debris 15 will be gravitationally urged downward along an upper surface of the debris filter 11 and will exit the down spout interface bladder via the debris egress opening 35. However, the larger the angle a the higher the debris filter 11 and the debris egress opening 35 are located in the down spout interface bladder. Such a location can make available more storage capacity in the down spout interface bladder in the event that rain water enters the down spout interface bladder at a rate that is faster than a rate that rain water can exit the down spout interface bladder through the outlet port (not shown in FIGS. 2G and 2H).

Thus, the angle a can be selected at any angle desired to balance gravitationally urging filtered debris 15 downward along an upper surface of the debris filter 11 to exit the down spout interface bladder via the debris egress opening 35 with providing a desired storage capacity in the down spout interface bladder in the event that rain water enters the down spout interface bladder at a rate that is faster than a rate that rain water can exit the down spout interface bladder through the outlet port (not shown in FIGS. 2G and 2H). In some embodiments, the angle $\alpha$ can be selected from values between around thirty degrees to around sixty degrees. In some embodiments, the angle a may be selected to have a value of around forty-five degrees or so. However, it will be appreciated that, as discussed above, the angle a may have any value as desired for a particular application. To that end, no limitation is intended and is not to be inferred regarding the value of the angle $\alpha$.

Referring back to FIG. 1, the rain water holding device 18 can be any type of containment device that can be receive and store rain water. Given by way of illustration and not of limitation, non-limiting examples of suitable containment devices that can be used as a rain water holding device 18 can include any type of holding device such as a pool, a berm, an open container, a closed container, or the like. It will be appreciated that any type of suitable containment device whatsoever can be used as desired for the rain water holding device 18 and that no limitation is intended.

Figure 3A:
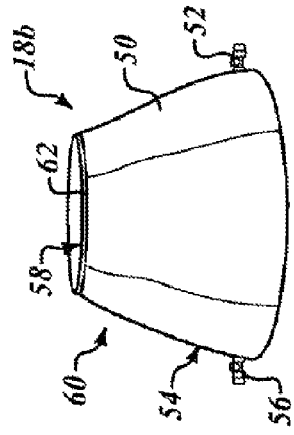
FIGS. 3A-3C are perspective views of illustrative embodiments of rain water holding devices.
Figure 3B:
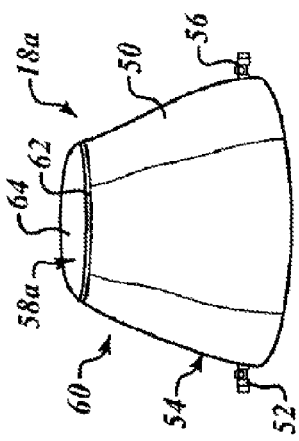
Figure 3C:
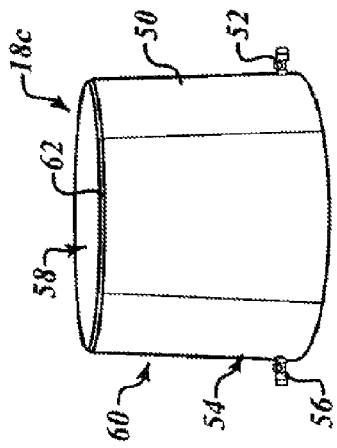

Referring additionally to FIGS. 3A, 3B, and 3C, in some embodiments rain water holding devices 18A (FIG. 3A), 18B (FIG. 3B), and 18C (FIG. 3C), can be provided as a bag, such as a self-supporting bag. Sides 50 of the bag are attached to a bottom 51 of the bag. The sides 50 can be self-supported by water tension exerted onto interior surfaces of the sides 50 by water contained within the bag.

The rain water holding device 18 may be made from any material as desired for a particular application. For example and without limitation, the rain water holding device 18 may be made from fabric such as vinyl-coated polyester, or vinyl-coated co-polymer, or urethane-coated polyester, or urethane-coated co-polymer, or the like. In some embodiments, the fabric from which the rain water holding device 18 is made may be potable water grade fabric, if desired.

Generally, the rain water holding device 18 includes an inlet port 52. The inlet port 52 is configured to receive therein rain water hydraulically communicated from the rain water holding device 12 (FIG. 1) via the tube member 19 (FIG. 1). The inlet port 52 suitably may include an opening, defined in the fabric of the rain water holding device 18, that is located toward a lower portion 54 of the rain water holding device 18. The inlet port 52 desirably may be located as low as practicable in the lower portion 54 in order to mitigate any possible losses to gravitational driving head of the rain water.

An exterior surface of the inlet port 52 may define threads such that the tube member 19 may be threadedly received thereon. If desired, an isolation fitting 34, including an isolation valve 36 and a threaded adapter 38, may be threadedly received on the threads of the inlet port 52. The isolation fitting 34 has been described above and its details need not be repeated. In such an arrangement, when desired the isolation valve 36 can be positioned to a shut position and the tube member 19 can be removed from the rain water holding device 18 without loss of water contained therein.

The rain water holding device 18 can further includes an outlet port 56. The outlet port 56 suitably may include an opening, defined in the fabric of the rain water holding device 18, that is located toward the lower portion 54 of the rain water holding device 18. The outlet port 56 desirably may be located as low as practicable in the lower portion 54 in order to mitigate any standing water that may remain in the rain water holding device 18 below the level of the outlet port 56.

The outlet port 56 suitably is arranged to engage (with a substantially water-tight seal) a tube member 19 to connect the tube member 19 to any device as desired for a particular application. In some embodiments, an exterior surface of the outlet port 56 may define threads such that the tube member 19 may be threadedly received thereon. If desired, other fittings (such as an isolation fitting 34, already described herein) may be threadedly received on the threads of the outlet port 56. In some applications, an outlet port 56 of one rain water holding device 18 may be hydraulically coupled with a tube member 19 to an inlet port 52 of another rain water holding device 18, thereby creating a network or system of rain water holding devices 18, as desired. In other applications, and referring briefly to FIG. 4, a watering device 57 can be hydraulically coupled to the outlet port 56 of a rain water holding device 18 via a tube member 19, thereby enabling a user to water plants, flowers, a lawn, or the like, with water contained in the rain water holding device 18.

In some embodiments when the rain water holding device 18 is a closed container, such as a bag, a top 58 may be attached to the sides 50 at an upper portion 60 of the rain water holding device 18. In some arrangements, the top 58 may be hingedly attached to the upper portion 60. In addition, if desired a closure device 62 may be arranged to releasably close a portion of the top 58 with a portion of the side 50, the closure device 62 may include any suitable closure device, such as without limitation a zipper, hook and loop fasteners, or the like.

Figure 3D:
FIGS. 3D-3F are perspective views of illustrative components of rain water holding devices.

In some embodiments and referring now to FIGS. 3A and 3D, the top 58 can be a domed top 58A. The domed top 58A suitably has an upper, outer surface 64 that is convex. The upper convex surface 64 can help minimize collection of water on an exterior of the top 58A. Reduction of water collected on the exterior of the top 58A can help reduce an amount of stagnant water that may attract mosquitoes.

Figure 3E:
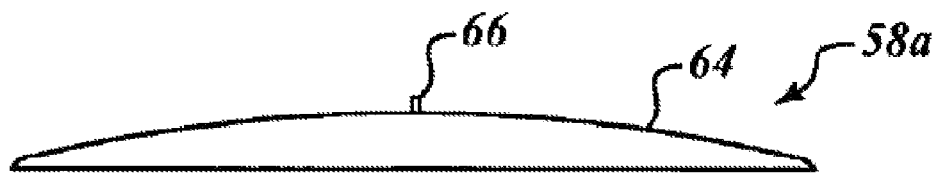

In some embodiments and referring additionally to FIG. 3E, the domed top 58A may be inflatable such that the outer surface 64 is convex. In some embodiments an inflation port 66 may be provided in the surface 64. In some other embodiments (not shown), the inflation port 66 may be provided in a lower surface of the domed top 58A (that is located in an interior of the rain water holding device 18).

Figure 3F:
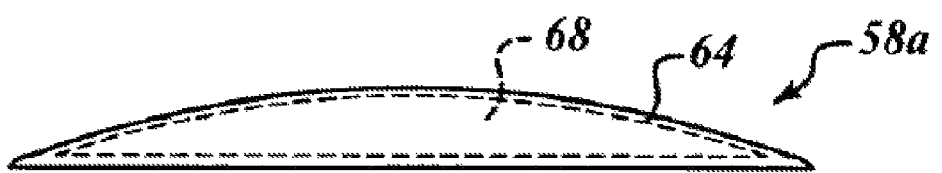

In some other embodiments and referring to FIG. 3F, the domed top 58A can include a convex support member 68 (shown in phantom). The convex support member 68 can be placed between the lower surface (not shown) and the upper surface 64 and sealed therein, such as by welding like radio-frequency welding or hot air welding. The convex support member 68 can be made of any material as desired, such as foam, plastic, or the like.

Figure 5A:
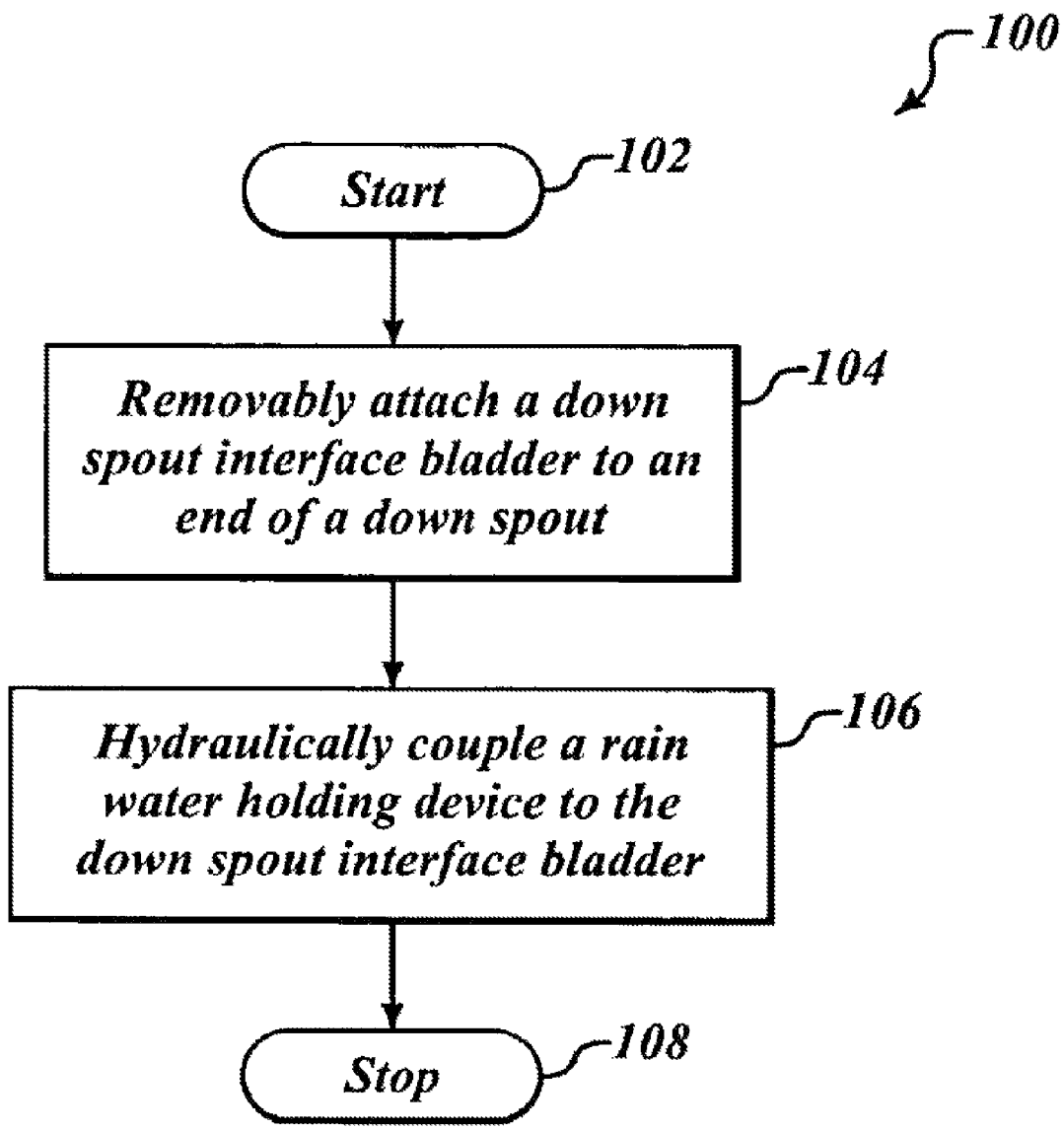
FIG. 5A is a flowchart of a method of collecting rain water.

Now that an illustrative system and non-limiting examples of components thereof have been described, an illustrative method for collecting rain water will be illustrated by way of non-limiting example. Referring now to FIG. 5A, an illustrative method 100 for collecting rain water starts at a block 102. At a block 104 a down spout interface bladder is removably attached to an end of a down spout. At a block 106 a rain water holding device is hydraulically coupled to the down spout interface bladder. The method 100 stops at a block 108. The blocks 104 and 106 (and further component blocks thereof, discussed below) may be performed in any order as desired. For example, the block 104 may be performed before the block 106, the block 106 may be performed before the block 104, or the block 104 may be performed at substantially the same time as the block 106, as desired.

Figure 5B:
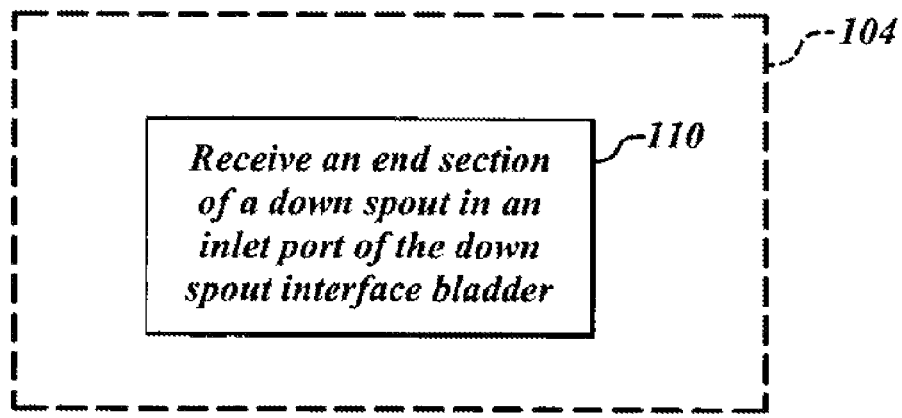
FIGS. 5B-5G are flowcharts of details of the method of FIG. 5A.

Referring now to FIG. 5B, in some embodiments removably attaching a down spout interface bladder at the block 104 can include receiving an end section of a down spout in an inlet port of the down spout interface bladder at a block 110.

Figure 5C:
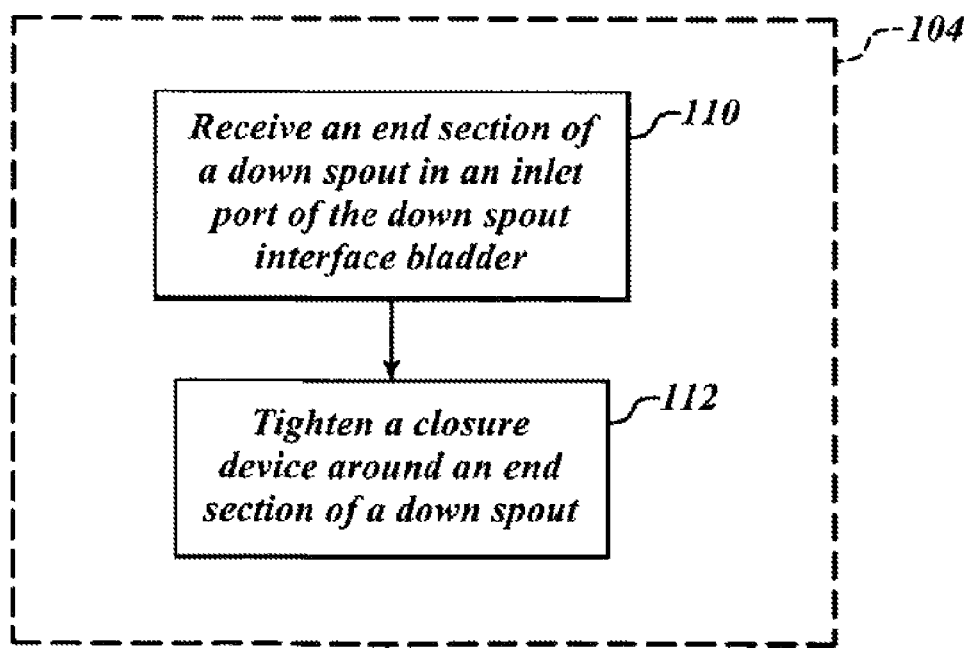

Referring now to FIG. 5C, in some embodiments removably attaching a down spout interface bladder at the block 104 can further include tightening a closure device around an end section of a down spout at a block 112.

Figure 5D:
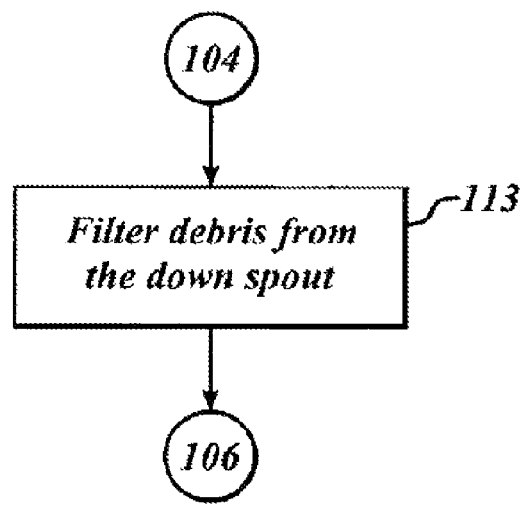

Referring now to FIG. 5D, in some embodiments debris from the down spout may be filtered at a block 113. For example, debris from the down spout may fall onto an upper surface of a debris filter, such as a screen having openings defined therein that suitably are sized to be smaller than the size of typical debris desired to be filtered. The filtered debris is then gravitationally urged downward along the upper surface of the debris filter and can exit the down spout interface bladder via a debris egress opening defined therein.

Figure 5E:
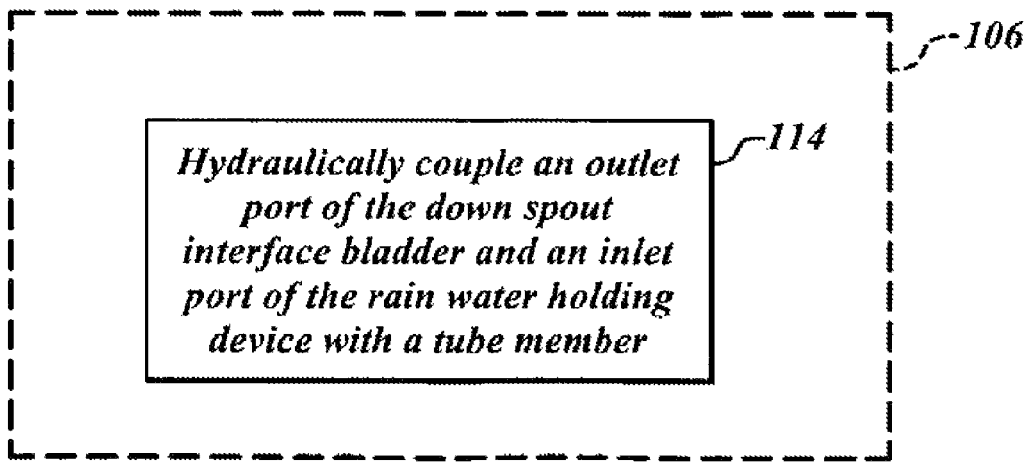

Referring now to FIG. 5E, in some embodiments hydraulically coupling at the block 106 can include hydraulically coupling an outlet port of the down spout interface bladder and an inlet port of the rain water holding device with a tube member at the block 114.

Figure 5F:
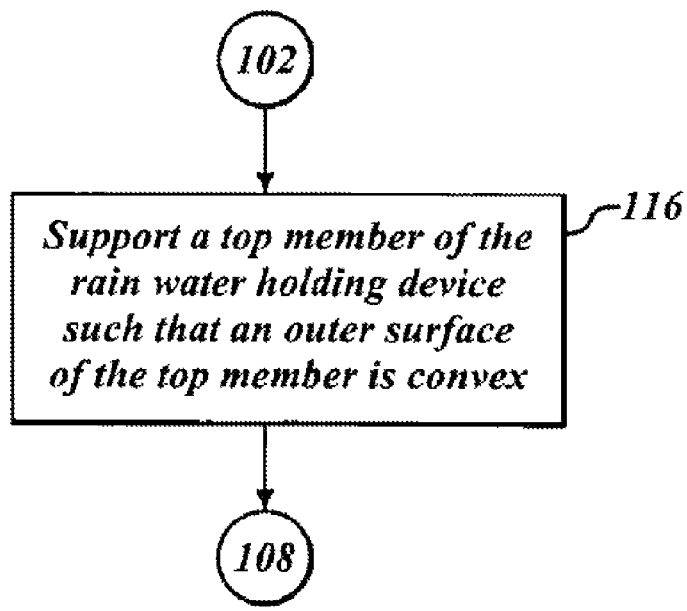
Figure 5G:
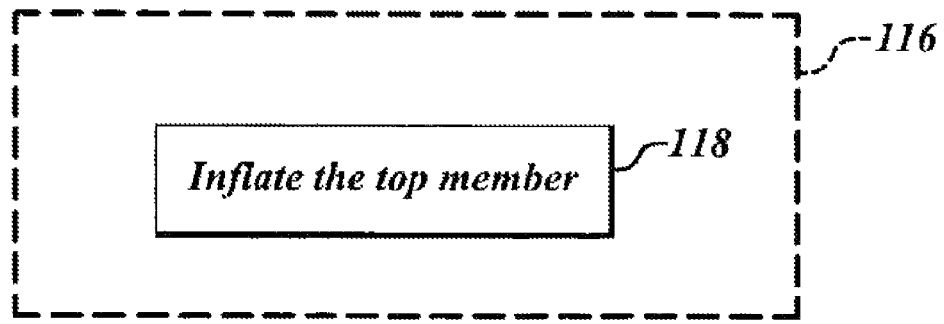

Referring now to FIG. 5F, in some embodiments at a block 116 a top member of the rain water holding device can be supported such that an outer surface of the top member is convex. In some embodiments and referring now to FIG. 5G, supporting a top member at the block 116 can include inflating the top member at a block 118.

Now that an illustrative system for collecting rain water, illustrative components thereof, and an illustrative method for collecting rain water have been set forth, non-limiting examples of fabrication methods will now be provided. It will be appreciated that process blocks need not be performed in the order illustrated herein. For example, in some embodiments some of the process blocks may be performed sequentially in the order illustrated herein, if desired. In some other embodiments, some of the process blocks may be performed sequentially in an order other than the order illustrated herein, if desired. In some other embodiments, some process blocks may be performed in parallel with each other, if desired.

Figure 6A:
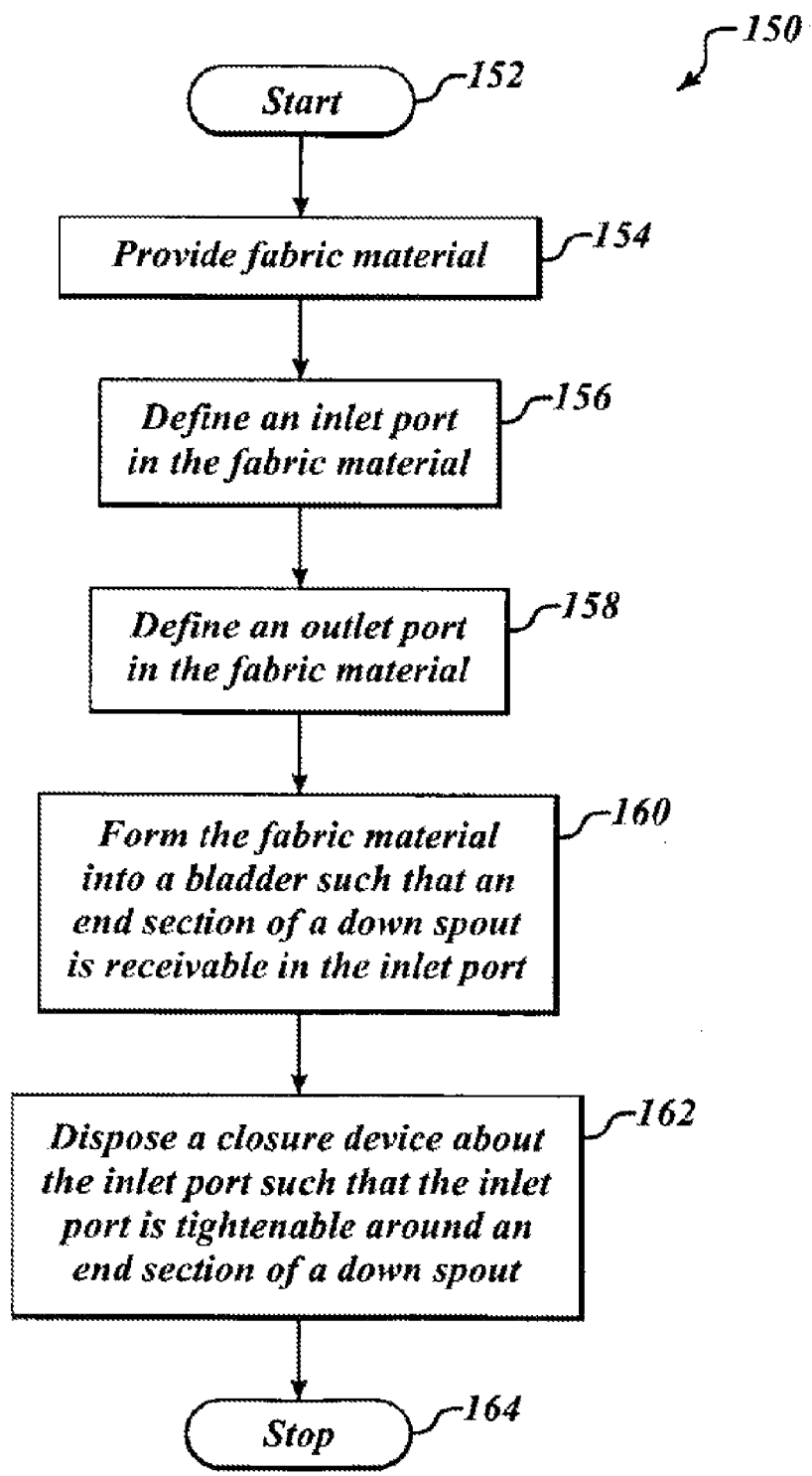
FIG. 6A is a flowchart of an illustrative method of fabricating a down spout interface bladder.

Referring now to FIG. 6A, a method 150 for fabricating a down spout interface bladder starts at a block 152. At a block 154 fabric material is provided. The fabric material can include without limitation fabric such as vinyl-coated polyester, or vinyl-coated co-polymer, or urethane-coated polyester, or urethane-coated co-polymer, or the like. In some embodiments, the fabric from which the down-spout interface bladder is made may be potable water grade fabric, if desired.

At a block 156, an inlet port is defined in the fabric material. At a block 158, an outlet port is defined in the fabric material. At a block 160, the fabric material is formed into a bladder such that an end section of a down spout is receivable in the inlet port. At a block 162 a closure device is disposed about the inlet port such that the inlet port is tightenable around an end section of a down spout. The method 150 stops at a block 164.

Figure 6B:
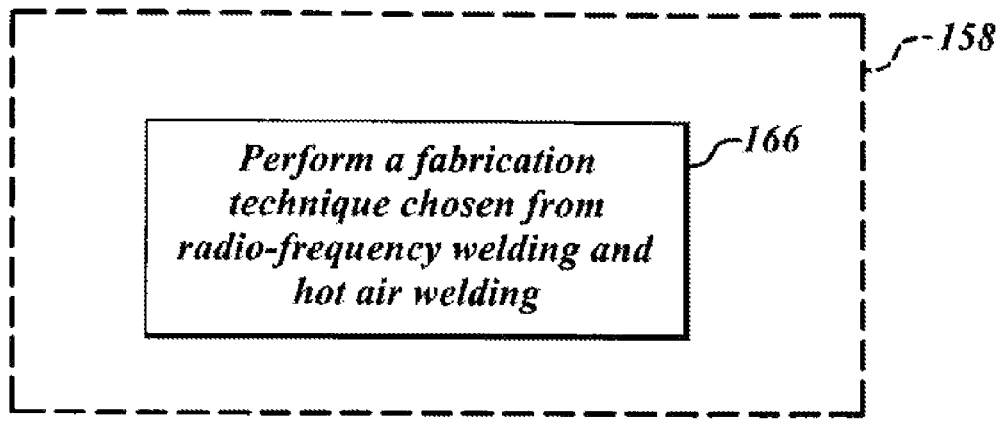
FIGS. 6B-6G are flowcharts of details of the method of FIG. 6A.

Referring now to FIG. 6B, defining an outlet port at the block 158 can include performing a fabrication technique chosen from radio-frequency welding and hot air welding at a block 166.

Figure 6C:
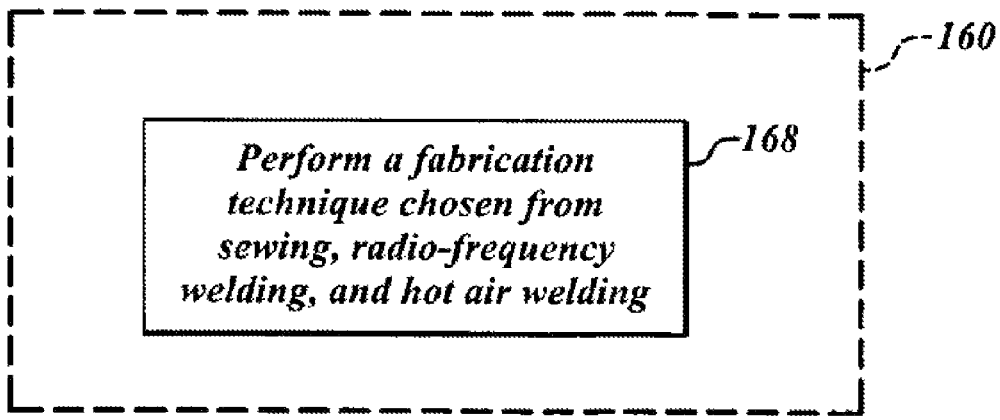

Referring now to FIG. 6C, forming the fabric material into a bladder at the block 160 can include performing a fabrication technique chosen from sewing, radio-frequency welding, and hot air welding at a block 168.

Figure 6D:
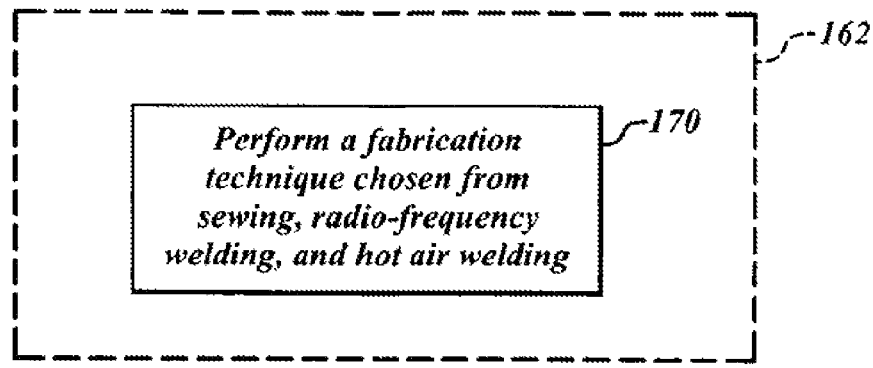

Referring now to FIG. 6D, disposing a closure device at the block 162 can include performing a fabrication technique chosen from sewing, radio-frequency welding, and hot air welding at a block 170.

Figure 6E:
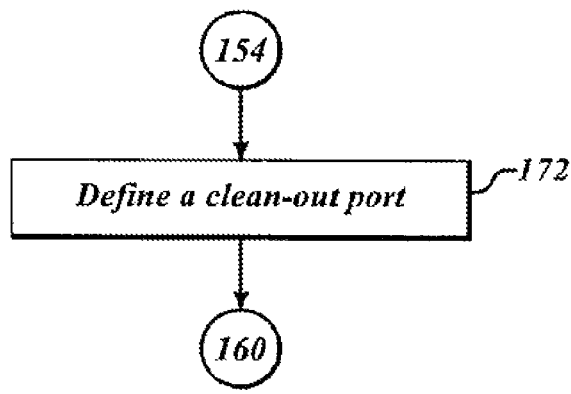

Referring now to FIG. 6E, in some embodiments at a block 172 a clean-out port can be defined, if desired. The clean out-port may be defined by performing any suitable fabrication technique, such as radio-frequency welding or hot air welding or the like.

Figure 6F:
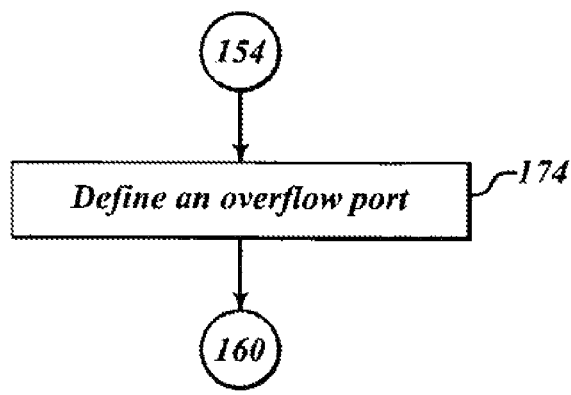

Referring now to FIG. 6F, in some embodiments at a block 172 an overflow port can be defined, if desired. The overflow port may be defined by performing any suitable fabrication technique, such as radio-frequency welding or hot air welding or the like.

Figure 6G:
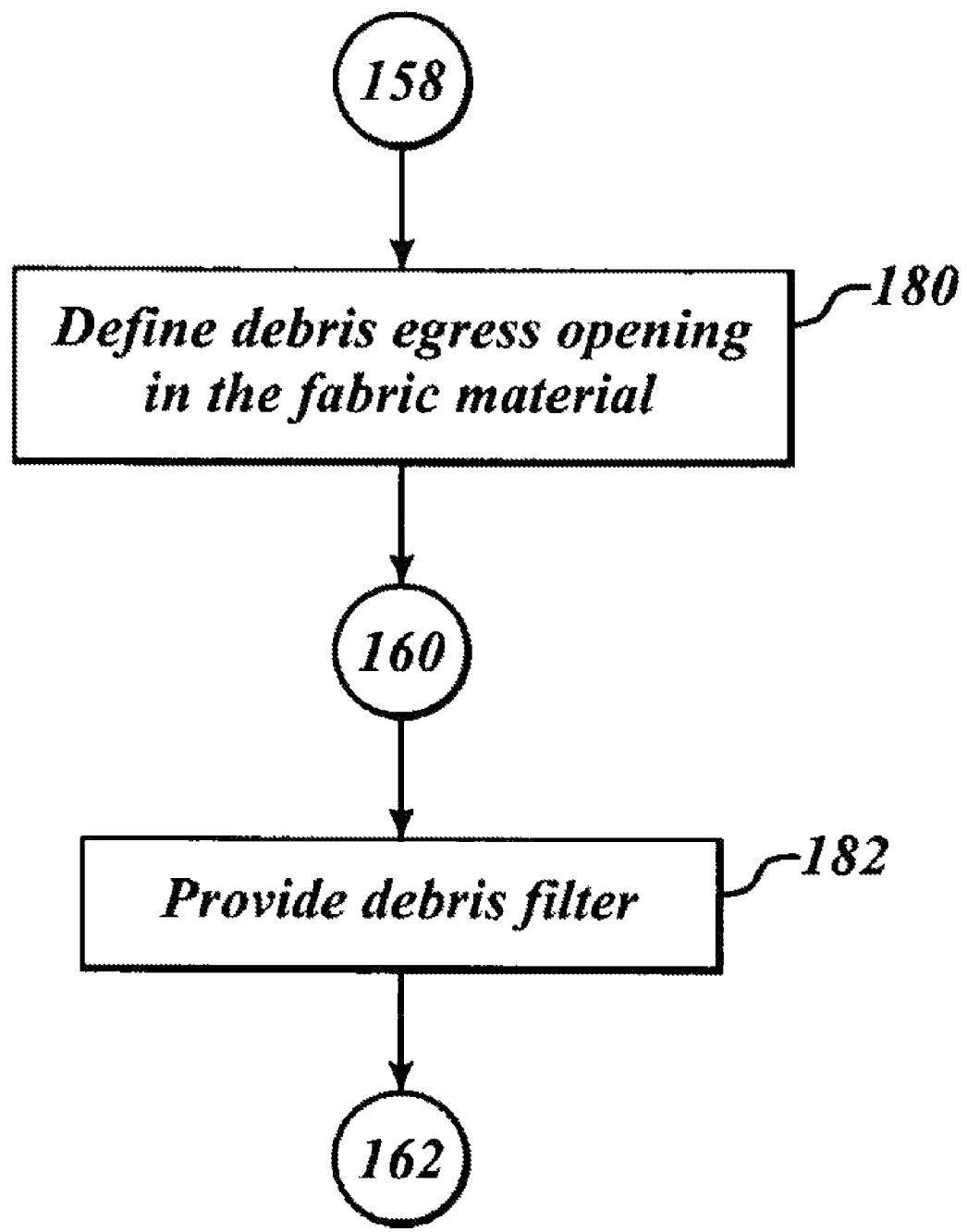

Referring now to FIG. 6G, in some embodiments a debris filter may be provided, if desired, for filtering debris from the down spout. At a block 180, a debris egress opening may be defined in the fabric material. The debris egress opening suitably is sized to permit filtered debris to exit the down spout interface bladder. Thus, the debris egress opening suitably is sized sufficiently large enough to accommodate passage of filtered debris therethrough. In some embodiments and as discussed above, sizing of the debris egress opening to approximate the size of the debris filter minimizes material remaining in the side of the down spout interface bladder in the vicinity of the debris filter. This approximate sizing of the debris egress opening therefore can help mitigate possibility of filtered debris from being snagged on material. Mitigating possibility of snagging filtered debris on material can help increase probability that filtered debris can exit the down spout interface bladder, thereby helping mitigate possibility of clogging the down spout interface bladder.

At a block 182 a debris filter may be provided. An upper portion of the debris filter suitably is provided toward the upper portion of the down spout interface bladder. In some embodiments, the debris filter is a screen arranged in a matrix of rows and columns of material that may be made of a mesh, such as without limitation a super mesh vinyl coated polyester or the like. Openings defined in the matrix suitably are sized to be smaller than the size of typical debris desired to be filtered, such as without limitation leaves, evergreen needles, moss, twigs, pine cones, and the like.

The debris filter is attached along an upper edge to a side of the down spout interface bladder. A lower edge of the debris filter is attached to an opposite side of the down spout interface bladder. The closer the lower edge of the debris filter is attached to the fabric material under a lower edge of the debris egress opening the minimizes substantially vertical fabric material remaining in the side of the down spout interface bladder above the bottom of the debris filter. Such a substantial alignment of the bottom of the debris egress opening and the bottom of the debris filter therefore can help mitigate possibility of filtered debris from being snagged on material. Mitigating possibility of snagging filtered debris on material can help increase probability that filtered debris can exit the down spout interface bladder, thereby helping mitigate possibility of clogging the down spout interface bladder. Side edges of the debris filter are attached to opposite sides of the down spout interface bladder. The debris filter suitably is attached to the down spout interface bladder using any desired attachment technique, such as without limitation: sewing; welding, like radio-frequency welding or hot air welding; or adhering, such as by gluing or bonding with an adhesive.

The blocks 180 and 182 may be performed in any order as desired. For example, the block 180 may be performed before the block 182, the block 182 may be performed before the block 180, or the block 180 may be performed at substantially the same time as the block 182, as desired. Moreover, the blocks 180 and 182 may be performed at any point in the method 150 as desired. To that end, the block 180 is shown as being performed after the block 158 and before the block 160 for illustrative purposes only. Likewise, the block 182 is shown as being performed after the block 160 and before the block 162 for illustrative purposes only. It will be appreciated that no limitation is intended and is not to be inferred regarding the point in the method 150 during which the blocks 180 and 182 are performed and that no limitation is intended and is not to be inferred regarding the order in which the blocks 180 and 182 are performed.

Figure 7A:
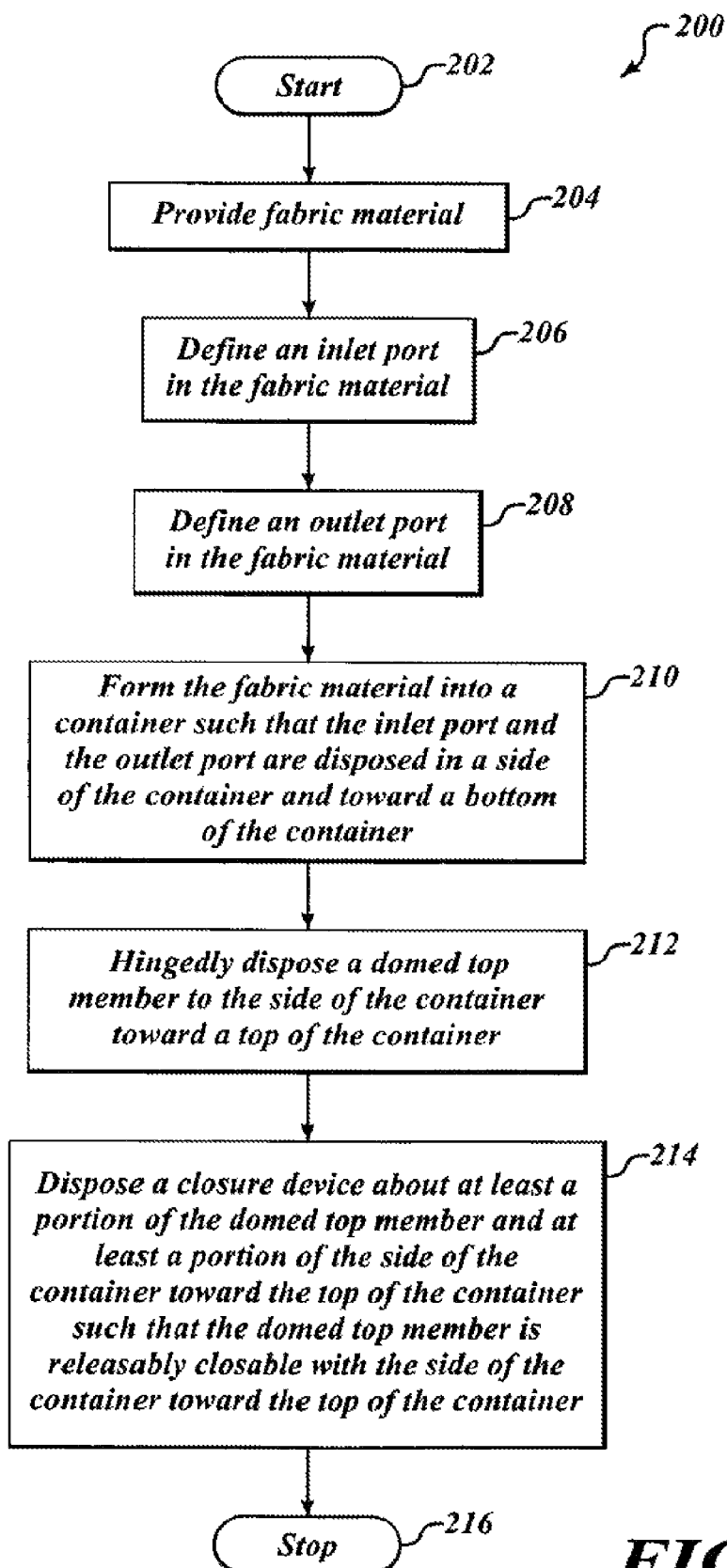
FIG. 7A is a flowchart of an illustrative method of fabricating a rain water holding device.

Referring now to FIG. 7A, a method 200 for fabricating a rain water holding device starts at a block 202. At a block 204 fabric material is provided. The fabric material can include without limitation fabric such as vinyl-coated polyester, or vinyl-coated co-polymer, or urethane-coated polyester, or urethane-coated co-polymer, or the like. In some embodiments, the fabric from which the rain water holding device is made may be potable water grade fabric, if desired.

At a block 206 an inlet port is defined in the fabric material. At a block 208 an outlet port is defined in the fabric material. At a block 210 the fabric material is formed into a container such that the inlet port and the outlet port are disposed in a side of the container and toward a bottom of the container.

At a block 212 a domed top member is hingedly disposed to the side of the container toward a top of the container. At a block 214 a closure device is disposed about at least a portion of the domed top member and at least a portion of the side of the container toward the top of the container such that the domed top member is releasably closable with the side of the container toward the top of the container. The method 200 stops at a block 216.

Figure 7B:
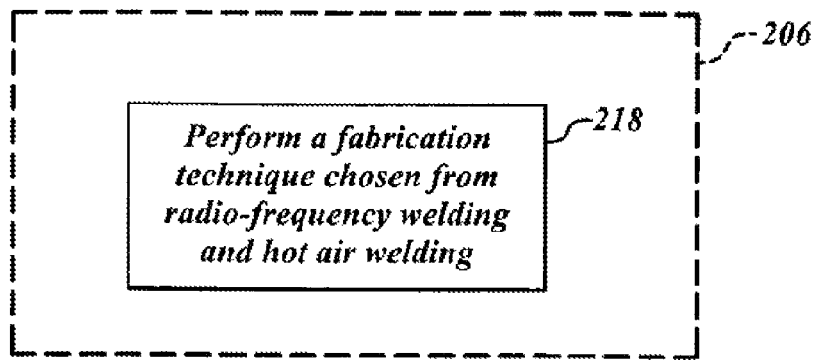
FIGS. 7B-7G are flowcharts of details of the method of FIG. 7A.
Figure 7C:
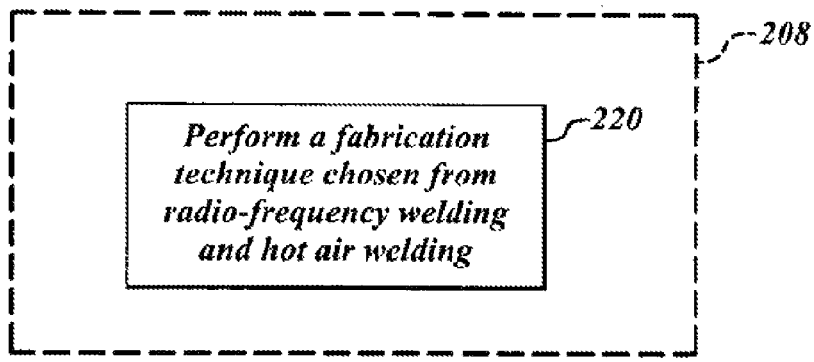
Figure 7D:
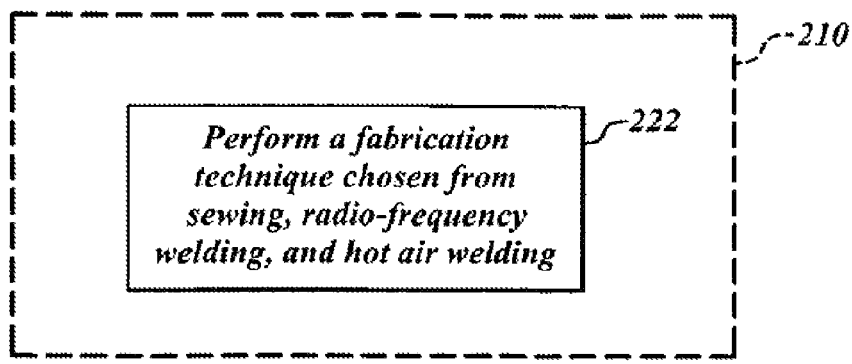

Referring now to FIG. 7B, defining an inlet port at the block 206 can include performing a fabrication technique chosen from radio-frequency welding and hot air welding at a block 218. Referring now to FIG. 7C, defining an outlet port at the block 208 can also include performing a fabrication technique chosen from radio-frequency welding and hot air welding at a block 220. Referring now to FIG. 7D, forming the fabric material into a container at the block 210 can include performing a fabrication technique chosen from sewing, radio-frequency welding, and hot air welding at a block 222.

Figure 7E:
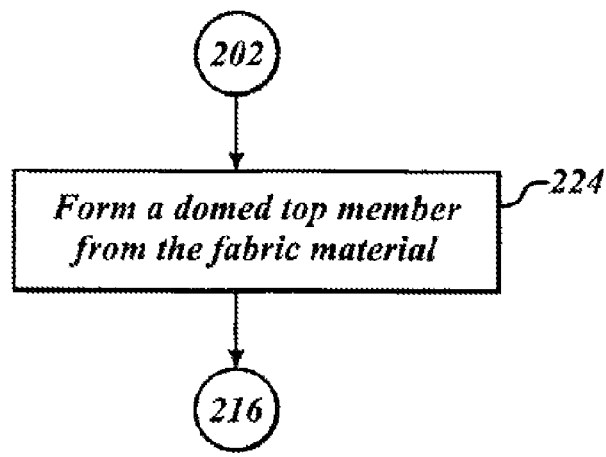
Figure 7F:
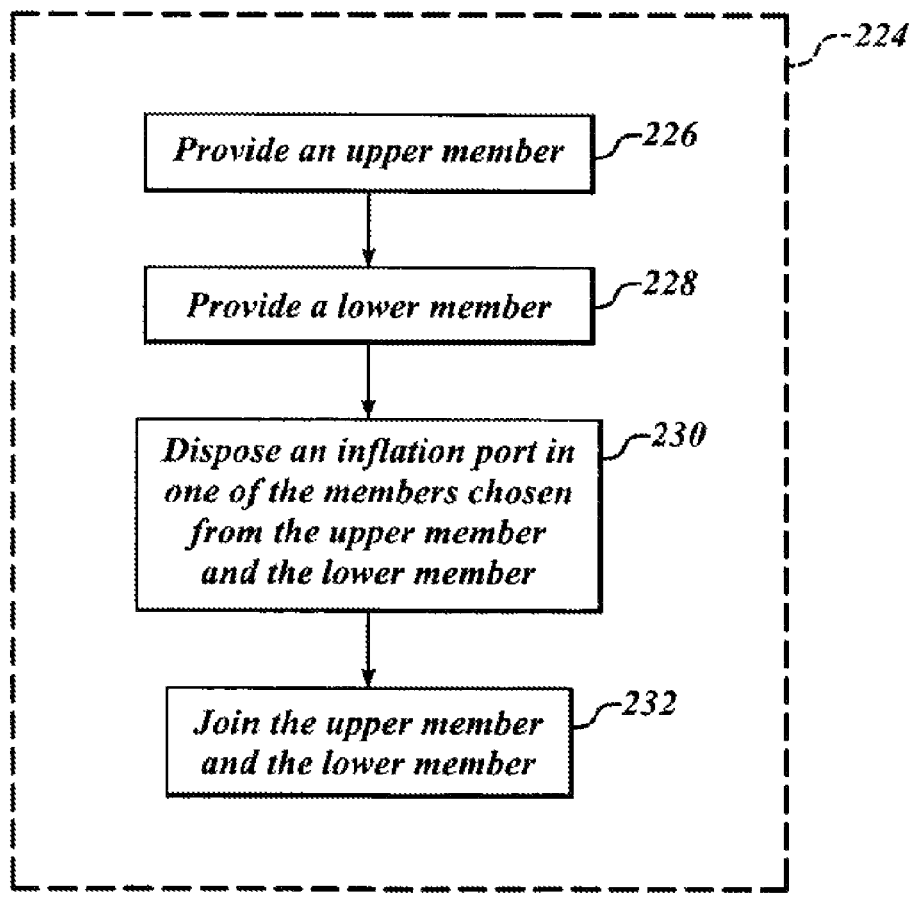

Referring now to FIG. 7E, at a block 224 the domed top member can be formed from the fabric material. In some embodiments the domed top member can be inflatable. In such embodiments and referring now to 7F, forming the domed top member at the block 224 can include providing an upper member at a block 226, providing a lower member at a block 228, disposing an inflation port in one of the members chosen from the upper member and the lower member at a block 230, and joining the upper member and the lower member at a block 232.

Figure 7G:
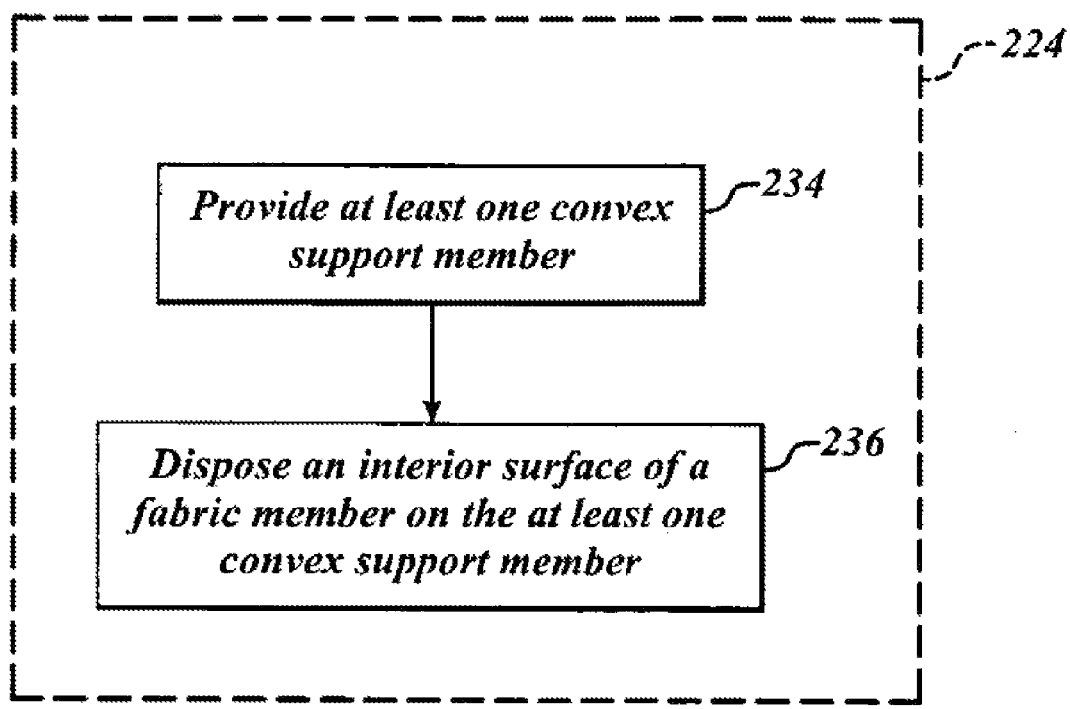

In some other embodiments the domed top member can include a convex support member. In such embodiments and referring now to FIG. 7G, forming the domed top member at the block 224 can include providing at least one convex support member at a block 234 and disposing an interior surface of a fabric member on the at least one convex support member at a block 236.

While a number of illustrative embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A down spout interface bladder comprising:
   a bladder body defining:
      an inlet port configured to receive therein an end section of a down spout;
      an outlet port;
      an interior chamber having a non-uniform cross-sectional area, the cross-sectional area of the interior chamber being relatively larger proximate the outlet port than proximate the end section of the down spout; and
      a closure device arranged to tighten the inlet port around the end section of the down spout.

2. The bladder of claim 1, wherein the closure device includes hook and loop fasteners.

3. The bladder of claim 1, wherein the closure device includes a drawstring.

4. The bladder of claim 1, wherein the closure device includes at least one set of male and female members.

5. The bladder of claim 1, further comprising a debris filter disposed in the bladder body.

6. The bladder of claim 5, wherein the debris filter includes a screen.

7. The bladder of claim 5, wherein the bladder body further defines a debris egress opening configured for filtered debris to exit the bladder body therethrough.

8. The bladder of claim 7, wherein the debris filter comprises:
   a screen member that spans across the interior chamber and is disposed at an angle such that a first portion of the debris filter proximate the debris egress opening is lower than a second portion of the debris filter situated opposite the interior chamber from the debris egress opening.

9. The bladder of claim 1, wherein the outlet port includes a threaded fitting.

10. The bladder of claim 1, further comprising a clean-out port.

11. The bladder of claim 1, further comprising an overflow port.

12. The bladder of claim 11, further comprising:
    an isolation fitting coupled to the bladder body in fluid communication with the overflow port, the isolation fitting having a coupling member configured to be threadably coupled with a conduit, and an isolation valve disposed between the coupling member and the overflow port.

13. The bladder of claim 1, wherein the bladder body comprises a bag-like bladder body.

14. The bladder of claim 1, further comprising:
    an isolation fitting coupled to the bladder body in fluid communication with the outlet port, the isolation fitting having a coupling member configured to be threadably coupled with a conduit, and an isolation valve disposed between the coupling member and the outlet port.

15. The bladder of claim 1, wherein the bladder body further defines an overflow port, the bladder further comprising:
    a first isolation fitting coupled to the bladder body in fluid communication with the outlet port, the first isolation fitting having a first coupling member configured to be threadably coupled with a first conduit, and a first isolation valve disposed between the first coupling member and the outlet port; and
    a second isolation fitting coupled to the bladder body in fluid communication with the overflow port, the second isolation fitting having a second coupling member configured to be threadably coupled with a second conduit, and a second isolation valve disposed between the second coupling member and the overflow port.

* * * * *